United States Patent [19]
Hara

[11] Patent Number: 5,379,663
[45] Date of Patent: Jan. 10, 1995

[54] MULTI-AXIAL JOY STICK DEVICE

[75] Inventor: Kenji Hara, Tamano, Japan

[73] Assignee: Mitsui Engineering & Shipbuilding Co., Ltd., Tokyo, Japan

[21] Appl. No.: 155,340

[22] Filed: Nov. 22, 1993

Related U.S. Application Data

[63] Continuation of Ser. No. 844,857, Mar. 3, 1992, abandoned.

[51] Int. Cl.6 .............................................. G05G 9/04
[52] U.S. Cl. ............................... 74/471 XY; 74/491
[58] Field of Search ............ 74/471 R, 471 XY, 491, 74/523, 546; 244/234, 236, 237; 273/148 B

[56] References Cited

U.S. PATENT DOCUMENTS

| | | |
|---|---|---|
| 3,028,126 | 4/1962 | Holleman . |
| 3,637,092 | 1/1972 | George et al. . |
| 3,936,015 | 2/1976 | Dean .................. 74/471 R X |
| 4,012,014 | 3/1977 | Marshall ............. 74/471 XY X |
| 4,069,720 | 1/1978 | Thor .................... 74/471 R |
| 4,491,325 | 1/1985 | Bersherm ............ 74/471 XY X |
| 4,895,039 | 1/1990 | Hegg .................... 74/471 XY |
| 4,914,976 | 4/1990 | Wyllie .................. 74/523 |
| 5,042,314 | 8/1991 | Rytter et al. ......... 74/471 XY X |

FOREIGN PATENT DOCUMENTS

| | | |
|---|---|---|
| 0164216 | 12/1985 | European Pat. Off. . |
| 0200091 | 11/1986 | European Pat. Off. . |
| 2158564 | 11/1985 | United Kingdom ............ 74/471 R |
| 2201758 | 9/1988 | United Kingdom ............ 74/471 R |
| 2248102A | 3/1992 | United Kingdom . |

Primary Examiner—Richard M. Lorence
Attorney, Agent, or Firm—Oliff & Berridge

[57] ABSTRACT

A device for remotely controlling a multi-axial device has: an arm on which an operator's arm is set; a handle connected to front end of the arm; and joints for the arm and the handle. By the operation of the operator's arm and hand set on the arm and handle, the arm can be extended and horizontally and vertically pivoted, and the handle can be horizontally and vertically pivoted and, preferably, rolled as well. The arm portion outputs operational changes with respect to three axes of the horizontal rotation, the vertical rotation and the extending movement. The arm front portion outputs operational changes with respect to the three axes of the horizontal, vertical and rolling rotations. Thus, the number of axes employed in the master can be increased to detect a variety of movements thereof. The operational directions of the joy stick agree with the directions of the three rectangular coordinate axes. Thus, the device provides three-dimensional data regarding position and angle.

5 Claims, 3 Drawing Sheets (1)

(2)

(1)

(2)

MULTI-AXIAL JOY STICK DEVICE

This is a continuation of application Ser. No. 07/844,857 filed Mar. 3, 1992, now abandoned.

BACKGROUND OF THE INVENTION

1. Field of the Invention

The present invention relates to an improved joy stick device, and more specifically, to a multi-axial joy stick device which employs an increased number of operational axes to facilitate a sophisticated control operation for an object having many operational axes, such as a manipulator.

2. Description of the Related Art

A conventional joy stick device comprises an operational stick supported by a ball bearing or the like so that the stick can be pivoted or rotated. The components of the rotation, or displacement, of the stick are taken along two rectangular coordinate axes. Each of the components of a displacement are detected as an amount of rotation about the corresponding axis by a potentiometer or the like. The detection signals are proportionally outputted to a controlled device. Thus, the controlled device is moved in a plane in a desired direction by operating the joy stick.

In most of the conventional joy stick devices, since a movement of the operational stick is detected as the amount of rotation about each of the two rectangular coordinate axes, the movements of a controlled device can be controlled only in a plane. Therefore, to control the controlled device in three dimensional space, a plane of the movement is shifted frequently by, for example, operating a switch. Such a technique has problems in that the switching operation to shift the plane becomes troublesome, and because the directions of the stick operation do not correspond to the directions of the controlled device's movement, operability is substantially lowered. These problems are significant particularly when a conventional joy stick is used to manually control a multi-axial machine such as a manipulator.

SUMMARY OF THE INVENTION

An object of the present invention is to provide a joy stick device in which the number of axes can be increased to detect a variety of movements of the device. Another object of the present invention is to provide a multi-axial joy stick device wherein the directions of the joy stick operation correspond to the directions of three rectangular coordinate axes so that data regarding position and angle of the controlled device in three dimensional space can be provided.

To achieve the above-mentioned objects, in a multi-axial joy stick device according to the present invention, an extendable arm on which an operator's arm is set for operation is mounted to a base by means of a base bracket having two rotational shafts perpendicular to each other. A handle is mounted to a front end portion of the extendable arm by means of a front bracket having two shafts perpendicular to each other. Thus, the device possesses a structure with five degrees of freedom. Each joint is provided with a means for recovering a neutral position thereof. The rotational joints and the slidable joint between the members are provided with sensors for detecting the rotational and sliding displacements.

In such a construction, when an operator's arm is set on the arm and his hand is gripping the handle, the swinging movement of his arm about his elbow and the movements of his hand are transmitted as control signals to the controlled device. Since the handle is connected to the arm by means of the front bracket having two perpendicular axes, the operator can turn the handle up, down, left and right by moving his wrist accordingly. Since the arm is connected to the base by means of the base bracket having two perpendicular axes, the operator can pivot the arm horizontally and vertically by swinging his arm about his elbow accordingly. Further, since the arm is extendable, when the operator moves his arm forward or backward with his hand gripping the handle, the arm extends or retracts, providing data regarding the displacement and speed thereof. According to the rotational angle or the displacement of each member detected by the corresponding sensor, the position or velocity signal of the controlled device are obtained. Thus, the position and angle of the controlled device can be controlled in three dimensional space.

Alternatively, one more axis may be added to the above construction to make a six-axis device as below. The front bracket is connected to a second front bracket having a shaft whose axis extends through the intersecting point of the two axes of the perpendicular shafts of the front bracket. Further, the perpendicular shafts of the front bracket may be arranged so that the intersecting point of the axes of the shafts coincides with the center of an operator's wrist set on the device in order to upgrade the operability.

If the number of the rotational shafts is increased as described above, the number of the detection axes can be accordingly increased for detecting the movement of the operator's arm and hand. If the intersecting point of the three perpendicular shaft axes coincides with the center of the operator's wrist, the movement of his wrist portion can be more accurately detected; the translational movement of his wrist portion is detected by one of the sensors provided for the three axes at the base-side of the arm; and the rotational movement of his wrist portion (hand) is detected by sensors provided for the three axes at the front-side of the arm. A reverse switch may be provided on the handle for conveniently switching modes of operation of the members, for example, forward and backward, while operating the device.

The device may be installed in a chair as the armrest, so that the operator is comfortably and firmly supported by the chair during operation. Thus, work efficiency will be upgraded.

As described above, according to the present invention, the number of the detection axes employed in a multi-axial joy stick device can be increased up to six, and the operational directions of the handle will be substantially equal to the directions of three rectangular coordinate axes. Thus, data for controlling the position and angle of a controlled device can be generated.

BRIEF DESCRIPTION OF THE DRAWINGS

FIG. 1(2) is a schematic representation of the centers of rotation of the joy stick device of FIG. 1(1).

DESCRIPTION OF THE PREFERRED EMBODIMENTS

Embodiments of the multi-axial joy stick device according to the present invention will be described in detail hereinafter with reference to the drawings.

Figure 1:
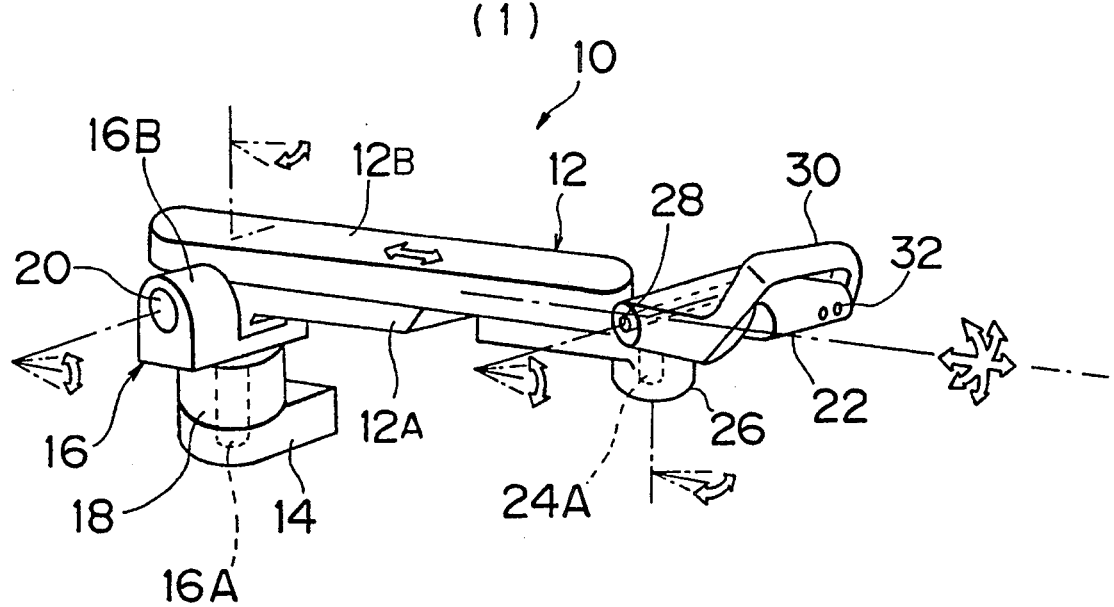
FIG. 1(1) is a perspective view of a multi-axial joy stick device according to the first embodiment of the present invention.
Figure 1:
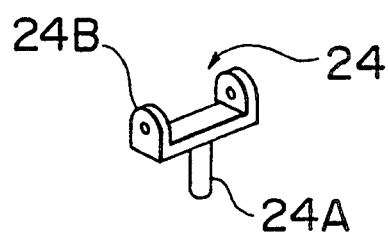
Figure 2:
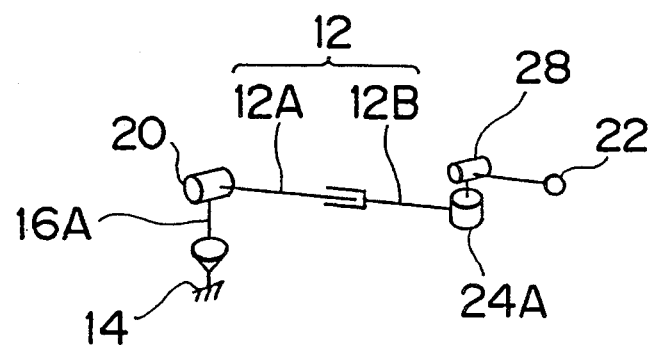
FIG. 2 is a skeleton view of the multi-axial joy stick device shown in FIG. 1.

Referring to FIGS. 1 and 2, a joy stick device 10 has an arm 12 which is substantially as long as a human arm so as to support the arm of an operator. The arm 12 is composed of a main arm 12A and a sub-arm 12B slidably connected to each other. Thus, the arm 12 is extendable. According to this embodiment, the arm 12 is extendable in the lengthwise direction by a sliding means, for example, a dovetail and dovetail-groove. The main arm 12A is positioned under the sub-arm 12B so that the main arm 12A will not obstruct the extending or contracting operation made by the operator's arm set on the arm 12. Instead of the above-mentioned sliding means, a cylinder means or other type of guiding means may be employed.

The extendable arm 12 is connected at a base end portion of the main arm 12A to a fixed base 14 by means of a base bracket 16. The base bracket 16 provides two rotational axes, perpendicular to each other, for the main arm 12A to horizontally and vertically rotate about. In detail, the base bracket 16 is integrally formed of a vertical shaft 16A and a substantially U-shaped bracket portion 16B extending from the top end of the vertical shaft 16A. The base bracket 16 is mounted to the base 14 by inserting the vertical shaft 16A through a cylindrical hub 18, whose axis is perpendicular to the surface of the base 14, so that the base bracket 16 (particularly, the U-shaped bracket portion 16B) can be horizontally rotated about the axis of the vertical shaft 16A. The base end portion of the main arm 12A is fitted between the two arm-like projections of the U-shaped bracket portion 16B. A horizontal shaft 20 is inserted through both the U-shaped bracket portion 16B and the base end portion of the main arm 12A. The inserted horizontal shaft 20 is perpendicular to the lengthwise direction of the arm 12. Thus, the main arm 12A is vertically rotatable about the horizontal shaft 20. By such a construction, the arm 12 is allowed the horizontal rotations and the vertical rotation, about the connection between the arm 12 and the base 14.

A handle 22 is connected to a front end portion of the slidable sub-arm 12A by means of a front bracket 24 which is constructed in substantially the same manner as the base bracket 16. The bracket 24 is integrally formed of a vertical shaft 24A and a substantially U-shaped bracket portion 24B extending from the top of the vertical shaft 24A. A cylindrical hub portion 26 is formed at the front end portion of the sub-arm 12B, with its axis being perpendicular to the axis of the sub-arm 12B. The vertical shaft 24A of the front bracket 24 is inserted into the cylindrical hub portion 26 so that the front bracket 24 is rotatable about the axis of the vertical shaft 24A, which is perpendicular to the axis of the arm. The U-shaped bracket portion 24B receives the handle 22, such bracket fitting on the two side surfaces of the handle 22. A horizontal shaft is inserted through both the U-shaped bracket portion 24B and the handle 22 so that the handle 22 can be vertically pivoted. In this manner, the handle 22 is allowed the horizontal and vertical rotations about the front end of the arm 12.

The handle 22 is formed as a flat plate having a certain thickness. To hold the handle 22, an operator lays his palm on the horizontal top surface thereof and hooks his fingertips on the front end surface thereof. To secure the hold of the handle 22 during operation, an arch-like member 30 which supports the back of the hand is mounted firmly to the handle 22. Switches 32 are provided on the front end portion of the handle 22 so that the operator can switch from the obverse to the reverse, or the other way around, of each mode during operation.

The joy stick device 10 having rotational joints and a sliding joint has a means for automatically returning each movable member to a neutral position which is defined on each movement path. Such a means comprises: a coil spring or the like provided at each of the rotational axes 16A, 20, 24A and 28 for restricting the rotation thereof; and a compressed or extended coil or the like provided at a sliding joint portion of the arm 12. A weight balancer may be provided at a weight supporting portion, such as a base end portion of the arm 12. Thus, when a movable member does not receive force caused by the operator's hand or arm, the movable member is automatically returned to the defined neutral position thereof. Each movable portion is provided with a sensor for detecting a displacement of the corresponding movable member from the neutral position. The rotational joints are provided with rotational sensors such as potentiometers or rotary encoders, and the sliding portion is provided with a linear sensor such as a linear potentiometer or an ultrasonic distance finder.

To operate the multi-axial joy stick device 10, an operator lays his arm on the arm 12 and inserts his hand between the handle 22 and the arch-like member 30 to hold the handle 22. The operator pivots his arm together with the arm 12 about his elbow, in other words, the base bracket 16 to a desired position. If he moves his arm forward or backward, the sub-arm 12B slides forward or backward; i.e. the arm 12 extends or contracts. Adjusting the position of the front end of the arm 12 by such operation, the operator uses his wrist to horizontally or vertically turn the handle 22. Thus, the handle 22 can be operated in substantially the same manner as a conventional joy stick device. A movement of each movable member is detected by the corresponding sensor, and a computer (not shown), for example, could receive the movement signals from the sensors and control the motion of a controlled device. During operation of the multi-axial joy stick device 19, the computer sends to the controlled device a command regarding velocity based upon the proportion of displacement from each of the neutral positions, the velocity being expressed in the operational coordinate system of the controlled device. The position and angle of the control point of the device is thus controlled.

Figure 3:
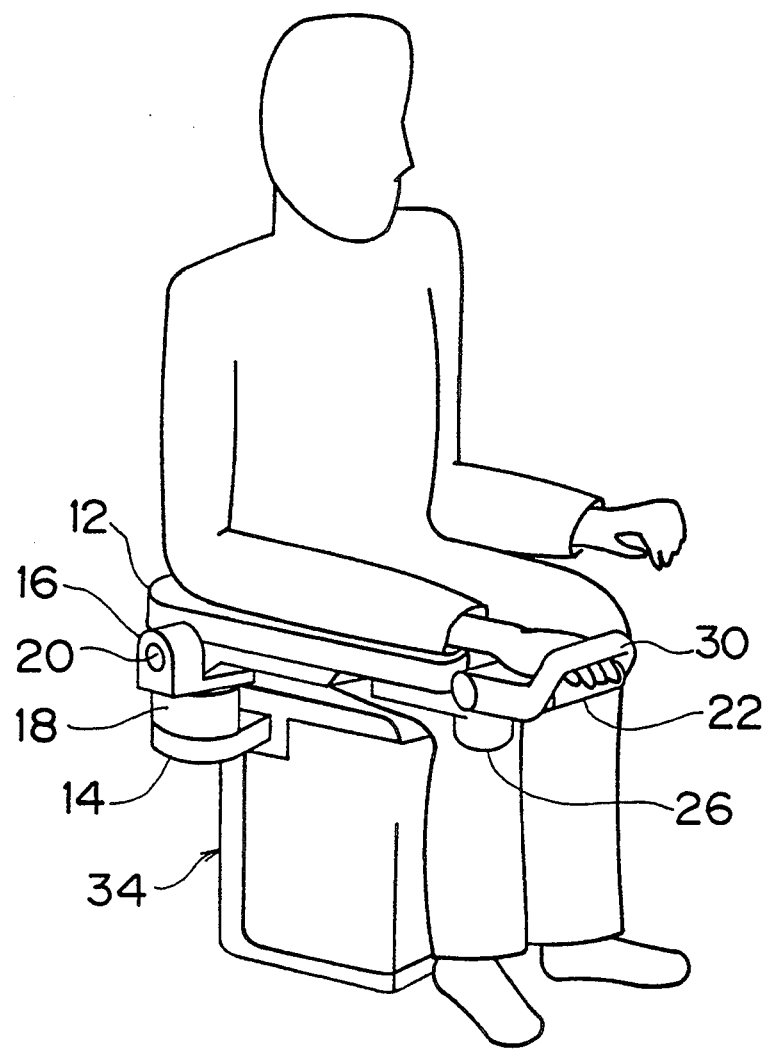
FIG. 3 is a perspective view of an example in which the multi-axial joy stick device is set at an arm position of a chair.

Illustrated in FIG. 3 is an operational condition of the above-described multi-axial joy stick device installed in a chair at the armrest position. The base 14 is fixed to a side surface of a chair 34 at an appropriate height so that the arm 12 sufficiently works as an armrest. In such a construction, the operator is able to stay sitting in the chair 34 during operation.

Figure 4:
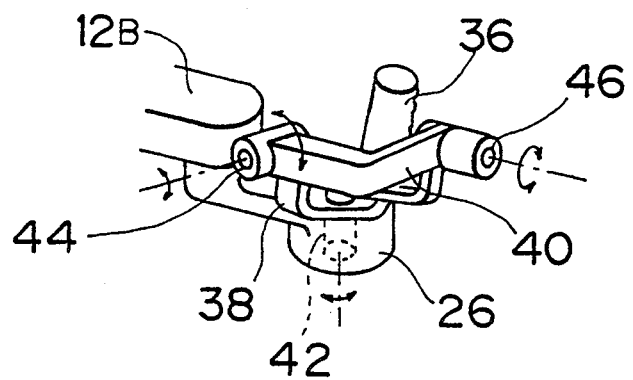
FIG. 4 is a fragmentary perspective view of a multi-axial joy stick device according to the second embodiment of the present invention.

FIG. 4 illustrates the main portion of a multi-axial joy stick device according to the second embodiment of the present invention. Referring to FIG. 4, a handle 36 is formed as a rod instead of a plate. Two brackets 38, 40 are provided at the front end of the arm 12 for allowing rotations about three axes perpendicular to one another. In detail, a vertical shaft 42 of a first bracket 38 formed substantially in the shape of an L is inserted through a cylindrical hub 26 formed at a front portion of the sub-arm 12B so that the first bracket 38 is horizontally rotatable about the axis of the vertical shaft 42. A first horizontal shaft 44, perpendicular to the vertical shaft 42, is connected to a vertical plate portion of the first bracket 38. A second bracket 40 formed substantially in the shape of an L is connected at one end portion thereof to the first horizontal shaft 44 so that the L-shaped second bracket 40 lies on a horizontal plane with the other end portion thereof extending in front of the arm 12, across the axis of the arm 12. Thus, the second bracket 40 can be vertically pivoted in front of the arm 12. A second horizontal shaft 46 is connected to the other end portion of the second bracket 40 so as to extend along the axis of the arm 12. The rod handle 36 is connected to the second horizontal shaft 46 so as to be rotatable on a plane perpendicular to the axis of the arm 12.

Thus, according to the second embodiment, the handle 36 can be rotated in front of the arm 12, about three perpendicular axes instead of two perpendicular axes in the first embodiment. Thus, a joy stick device according to the second embodiment generates six kinds of data (six dimensions) with respect to the position and angle of the control point of the device in the three dimensional space of the operation.

Figure 5:
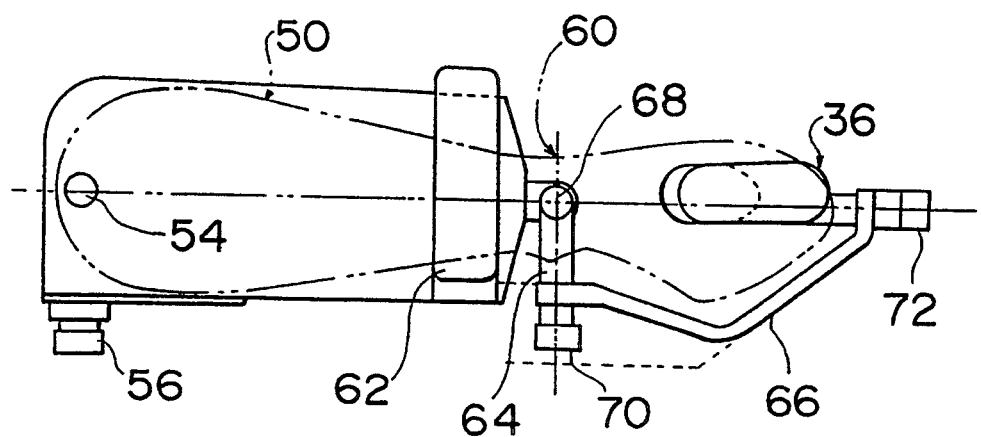
FIGS. 5(1) and 5(2) are plan and side views, respectively, of a multi-axial joy stick device according to the third embodiment of the present invention.
Figure 5:
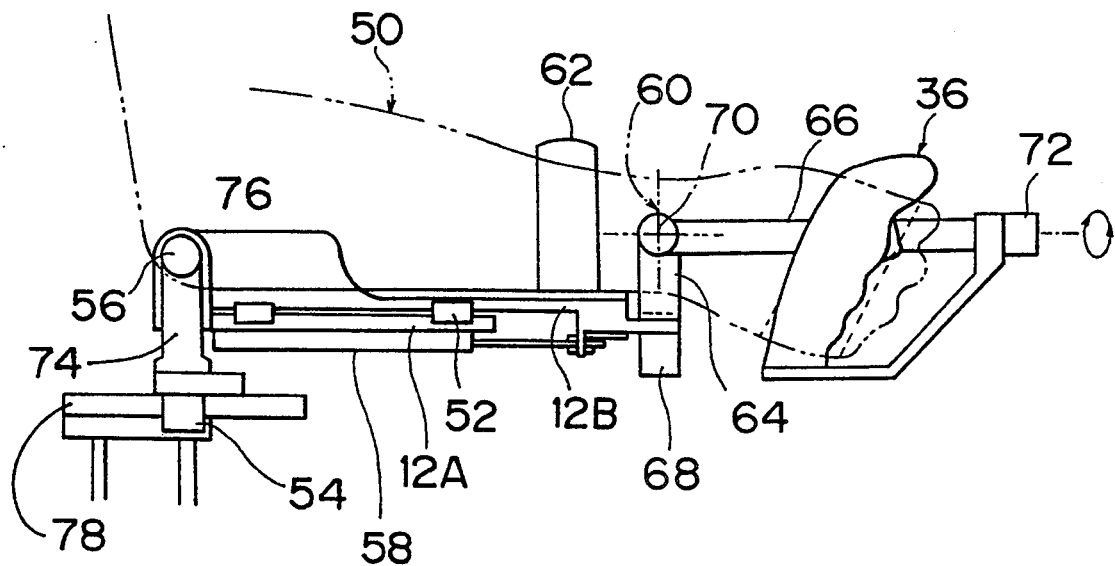

According to the third embodiment of the present invention, the second embodiment is modified in the following way: the rotational shafts of the handle are arranged so that the intersecting point of these three perpendicular rotational axes coincides with the center of an operator's wrist set on the joy stick device. Referring to FIGS. 5(1) and 5(2), the arm 12, on which an operator's arm 50 is set, is extendable by means of a linear guide 52. A base bracket 74 connects a rear end portion of extendible arm 12 to base 78. Top bracket 76 is erected from extendible arm 12 at an end connected to the base 78. The entire arm 12 is three-dimensionally movable by means of three shafts 54, 56 and 58 perpendicular to one another provided at the base end portion of the arm 12. Two brackets, 64 and 66 are provided at the front end of arm 12. First bracket 66 connects handle 36 to arm 12 through second bracket 64. The handle 36 is also three-dimensionally movable in front of the arm 12, around three shafts 68, 70 and 72 perpendicular to one another. First front bracket 66 is connected to second bracket 64 through horizontal shaft 70. The rotational shafts 68, 70 and 72 of the handle 36 are arranged so that the intersecting point of the rotational axes of the shafts 68, 70 and 72 coincides with the operator's wrist 60. A strap 62 is provided for firmly fixing the operator's arm 60 on the arm 12.

With such a construction, the linear and rotational movements of the operator's wrist portion can be accurately transmitted to the joy stick device.

What is claimed is:

1. A multi-axial joy stick device for remotely controlling a multi-axial controlled device, comprising:

an extendable arm on which an operator's arm is set, said arm having a movable arm portion extendable by a sliding joint;

a base bracket which connects a rear end portion of said extendable arm to a base and a top bracket erected from said extendable arm at an end connected to said base, said base bracket and said top bracket having two rotational shafts perpendicular to each other at said rear end portion of said arm to form a rotational joint at an operator's elbow, one of said two rotational shafts being a horizontal rotary shaft secured to a top portion of said top bracket;

a handle provided at a front end portion of said extendable arm; and a first front bracket which connects said handle to the arm and which provides two front rotational shafts perpendicular to each other at said front end portion of said arm and a second front bracket with another rotational shaft connected to said first front bracket with an axis of said another rotational shaft extending through an intersecting point of the axes of said two shafts of said first front bracket wherein said first and second front brackets are arranged so that the intersecting point of the axes of the front rotational shafts coincides with the center of an operator's wrist set on the device to form a rotational joint at said operator's wrist.

2. A multi-axial joy stick device according to claim 1, wherein said handle is rotatably connected to the second front bracket.

3. A multi-axial joy stick device for remotely operating a multi-axial controlled device, comprising:

a main arm on which an operator's arm is set;

a sub-arm slidably connected by a sliding joint to said main arm;

a base bracket which has two rotational shafts perpendicular to each other and which connects a rear end portion of said main arm by the rotational shafts to a base to form a rotational joint at an operator's elbow and a top bracket erected from said main arm at an end connected to said base bracket, one of said two rotational shafts being a horizontal rotary shaft secured to a top portion of said top bracket, said two rotational shafts being perpendicular to each other at said rear end portion of said arm to form a rotational joint so that said main arm can be horizontally and vertically pivoted;

a handle which is connected to a front end portion of said sub-arm;

a first front bracket which connects said handle to the sub-arm and which provides two rotational shafts perpendicular to each other at said front end portion of said arm and a second front bracket with another rotational shaft connected to said first front bracket with an axis of said another rotational shaft extending through an intersecting point of the axes of said two shafts of said first front bracket wherein said first and second front brackets are arranged so that the intersecting point of the axes of the rotational shafts of said front end portion coincides with the center of an operator's wrist set on the device to form a rotational joint at an operator's wrist connecting said handle to said sub-arm so that the handle can be horizontally and vertically pivoted.

4. A multi-axial joy stick device according to claim 3, wherein said base is formed of a member of a chair and the joy stick is placed at an armrest position of the chair.

5. A multi-axial joy stick device for remotely operating a multi-axial controlled device, comprising:

a main arm on which an operator's arm is set;

a sub-arm slidably connected by a sliding joint to said main arm;

a base bracket which has two rotational shafts perpendicular to each other and which connects a rear end portion of said main arm by the rotational shafts to a base to form a rotational joint at an operator's elbow and a top bracket erected from said main arm at an end connected to said base bracket, one of said two rotational shafts being a horizontal rotary shaft secured to a top portion of said top bracket, said two rotational shafts being perpendicular to each other at said rear end portion of said arm to form a rotational joint so that said main arm can be horizontally and vertically pivoted;

a handle which is connected to a front end portion of said sub-arm;

a first front bracket which connects said handle to the sub-arm and on which two of three front rotational shafts are perpendicular to each other at said front end portion of said arm and a second front bracket with a remaining front rotational shaft of said three front rotational shafts being connected to said first front bracket with an axis of said remaining front rotational shaft extending through an intersecting point of the axes of said two shafts of said first front bracket wherein said first and second front brackets are arranged so that the intersecting point of the axes of the front rotational shafts coincides with the center of an operator's wrist set on the device to form a rotational joint at an operator's wrist connecting said handle to said sub-arm so that the handle can be horizontally, vertically and rollingly pivoted.

* * * * *